Dec. 4, 1951      G. H. WINDSOR      2,576,986
STRAP CLAMPING AND TENSIONING MEANS
Original Filed Feb. 12, 1944
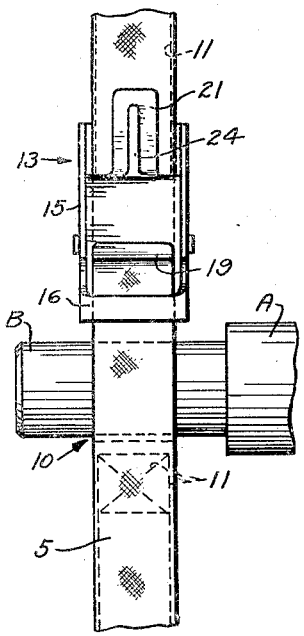
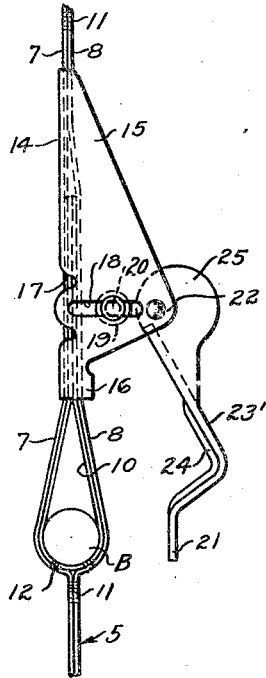
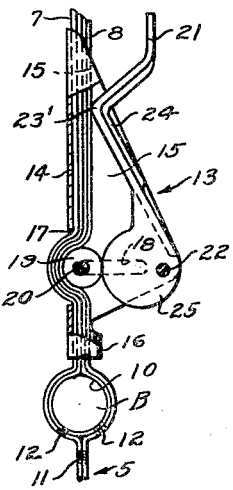
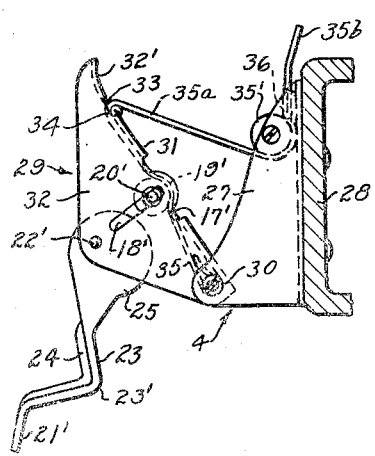
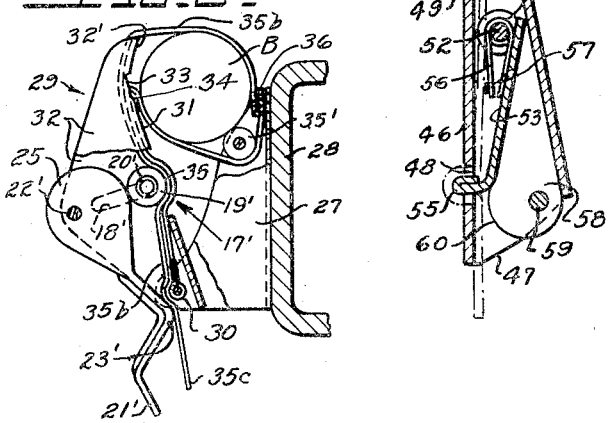
INVENTOR.
GEORGE H. WINDSOR
BY
ATTORNEYS Patented Dec. 4, 1951

2,576,986

UNITED STATES PATENT OFFICE 2,576,986

STRAP CLAMPING AND TENSIONING MEANS

George H. Windsor, Tujunga, Calif.

Original application February 12, 1944, Serial No. 522,179, now Patent No. 2,391,051, dated December 18, 1945. Divided and this application February 13, 1945, Serial No. 577,714

3 Claims. (Cl. 24—68)

(Granted under the act of March 3, 1883, as amended April 30, 1928; 370 O. G. 757)

The invention described herein may be manufactured and used by or for the Government for governmental purposes, without the payment to me of any royalty thereon.

This invention is a division of my co-pending application Serial No. 522,179, for Litter Supporting Apparatus, filed on February 12, 1944, which issued December 18, 1945, as Patent No. 2,391,051, and relates to strap clamping and tensioning means having quick and conveniently operable means for securing a plurality of flexible connecters together, such as a pair of superimposed strap members, or for effecting a quick release of the strap members, and has for one of its objects the provision of a movable clamping and tensioning member shiftably disposed on the strap members to simultaneously secure the flexible strap members together at points intermediate their ends and to move the end portions of the flexible strap members toward each other at opposite sides of the clamping and tensioning member.

Another object of the invention is the provision of clamping and tensioning means for use with flexible strap-like members, arranged to positively interlock the clamping means with the strap members to prevent relative movement therebetween and to simultaneously move the end portions of the strap-like members toward the clamping means during the clamping action.

A further object is the provision of a strap clamping and tensioning device including a rotary clamping member having a manually operable clamping lever for moving the clamping member to clamping position, tending to rotate the clamping member while in contact with the strap-like member to cause greater movement of one of the end portions of the strap-like member toward the clamping member than the movement of the other end portion of the strap-like member.

Other objects and advantages of the invention will become apparent from the following description, taken in connection with the accompanying drawing in which like-reference characters refer to like parts in the several figures.

Fig. 1 is an elevation view of my improved clamping and tensioning device, showing the same applied to a pair of litter supporting strap members.

Fig. 2 is an enlarged side elevation of my improved clamping and tensioning device as shown in Fig. 1, illustrating the same in its released position.

Fig. 3 is a longitudinal sectional view taken through my improved clamping and tensioning device as shown in Fig. 2, with the operating lever moved to clamping position.

Fig. 4 is a side elevation of a slightly modified form of my invention, illustrating the clamping and tensioning roller and the camming lever in release position.

Fig. 5 is a side elevation of the device shown in Fig. 4, illustrating the clamping lever and clamping and tensioning roller in clamping and tensioning position, parts being broken away and shown in section.

Fig. 6 is a longitudinal sectional view illustrating a further modification of my invention, having the clamping means therefor disposed in clamping and tensioning position.

Referring more particularly to Figs. 1, 2, and 3 of the drawings, the reference numeral 5 denotes a vertically-disposed flexible sustaining member, adapted to be secured at its opposite ends, to any convenient vertically-spaced securing means not shown.

The sustaining member 5, as illustrated, comprises a pair of flexible strap-like members 7 and 8, stitched together in vertically-spaced areas 11 and 12, to leave openings or spaces therebetween, each space having a litter sustaining loop member 10 disposed therein located between the strap-like members and intermediate the stitched areas. The intermediate litter sustaining loop members 10 are formed of flexible material and are bent to a U-shaped form with their end portions extending upwardly against the adjacent surfaces of the strap-like members 7 and 8 and secured to the strap members by the previously referred to stitching as shown in the drawings. The loop member 10 is adapted to receive one of the handle members B of a litter member A, more fully disclosed in my co-pending previously referred to Litter Supporting Apparatus patent application.

My improved strap clamping and tensioning means, indicated generally at 13, is disclosed as being slidably disposed on the supporting members 5 above the litter handle receiving loops 10. The clamping and tensioning means 13 each comprise an elongated base plate 14, having laterally extending triangular side flanges 15, projecting from the opposite sides of the base plate 14, in parallel relation to each other.

Extending across the strap engaging portion of the base plate 14 at one end of the device in spaced parallel relation to the base plate is a retainer bar or plate 16, having its opposite ends secured to the two side plates.

The strap receiving space between the retainer bar 16 and the adjacent surface of the base plate is only slightly greater than the thickness of the two strap portions 7 and 8 plus the thickness of the intermediate upturned ends of the U-shaped litter supporting loop member 10 so that the strap clamping and tensioning means is slidably retained on the flexible strap member 5, with the strap member extending between the bar 16 and the adjacent surface of the base plate, and between the two parallel side plates which project from the edges of the base plate.

The base plate 14 of the clamping device 13 has formed therein an elongated strap receiving slot 17, extending across the base plate, between the side flanges 15, 15, adapted to receive the laterally crimped portion of the flexible strap member 5 therein, as best seen in Fig. 3 of the drawings. The side flanges 15, 15 have parallel guide slots or openings 18 formed therein, disposed in a plane extending midway through the slot 17, at right angles to the surface of the base plate 14. The portions of the side flanges 15, 15, adjacent the ends of the slot 17 are extended beyond the plane of the surface of the base plate 14, and the guide slots or openings 18 extend from points substantially in the plane of the base plate to points adjacent the apex of the triangular-shaped side flanges 15, 15.

A strap deflecting member, in the form of a roller 19, is positioned between the side flanges 15, 15, and has reduced end extensions 20 disposed in the guide slots or openings 18. This roller is arranged to be cammed into the slot 17 by a camming lever 21, pivoted at 22 to the side flanges, beyond the ends of the guide slots or openings 18. The camming lever 21 comprises an angularly bent handle portion 23', reinforced at 24, having spaced eccentric camming plates 25 projecting laterally from the handle portion and disposed adjacent the inner faces of the side flanges 15, 15, of the base plate with the camming edges of the eccentric plates 25 disposed to engage the periphery of the roller 19 at its ends, effecting a rolling action on the roller as the same, and the strap portions 7 and 8 are cammed into the slot 17 in the base plate 14. The high points on the cam plate members 25 are disposed, with respect to the handle portion 23', so as to be moved past the camming contact points on the roller, when the camming lever 21 is moved to camming position, the angularly bent portion 23' constituting a stop means, retaining the free end of the lever 21 spaced from the base plate where it may be easily and conveniently grasped by the operator of the device, as best seen in Figures 3 and 5 of the drawings.

The relative width of the slot 17 in the base plate 14, and the diameter, or width of the strap deflecting and crimping member or roller 19 are such that the spaces between the surface of the roller at its opposite sides, and the edges of the slot 17, are approximately equal to the thickness of the layers of the strap being clamped, in order to obtain a positive clamping and holding effect on the sustaining member 5 as the lever 21 is moved to its final clamping position.

As before pointed out, the clamping members are slidably positioned on the sustaining members 5 one above each litter receiving opening formed between the two strap members of the sustaining member and the U-shaped loop member located between the two strap members. After the litter handles B are positioned in the loop portions, the clamping members are moved downwardly along the sustaining members 5 toward the loop portions, reducing the size of the loop openings to reduce the size of the loops around the handles.

As the clamping members are moved downwardly, as indicated above, the clamping levers 21 are moved from their released positions, as seen in Figure 2 to their clamping and tensioning positions, as disclosed in Figure 3. The periphery of the eccentric camming plates 25 engage the roller members 19, forcing the same into the slots 17 in the base plates 14, crimping the suspension members 5 and the upper portions of the loop members through the cross slot 17, effecting longitudinal movement thereof at opposite sides of the rollers, toward the openings, shortening the length of the suspension members 5. The operating engagement of the circular camming flanges 25 with the surface of the rollers 19 tends to cause rotation of the rollers, producing a tendency to cause further relative longitudinal movement of the strap and loop portions which are below the clamping members, toward the clamping members.

This action, and the crimping action of the rollers 19, on the strap portions above the litter sustaining portions of the loops produces a tension in the suspension members 5 between their secured ends, and a simultaneous tensioning of the strap portions 7 and 8 and the litter sustaining loop portions 10 extending around the handles B of the litters A.

As the clamping levers are moved to clamping position, the off-set or angle portions 23' of the levers 21 engage the surface of the strap portions maintaining the ends of the levers spaced from the straps, so that they may be easily grasped. When in this latter position, the high points on the eccentric cams 25 have passed beyond the cam contact surfaces of the rollers, making the devices self-locking.

It should be observed that the camming roller 19 is moved substantially midway into the slot 17, bending the crimped portion of the straps and loop members substantially at right angles, around the edges of the slot. This clamping or crimping of the straps between the edges of the slot 17 and the roller 19, provides a very secure retaining action on the portions of the suspension member 5 and on the loops which encircle the litter pole handle B.

In the operation of the clamping and tensioning device, the litter handle B is inserted into the loop 10 and the clamping member 13 is slid downwardly along the sustaining members 5 toward the litter handle as far as it will go. The clamping lever 21 is then moved to clamping position.

The modified form of clamping and tensioning device disclosed in Figs. 4 and 5 comprises a U-shaped bracket plate 27, fixed to one of the longitudinal members 28, forming a part of the supporting frame structure, as disclosed in my previously referred to co-pending application, to which the opposite ends of the vertical sustaining member are fastened. The bracket plate 27 has a triangular-shaped clamping frame 29, pivoted at 30 to the lower portion thereof.

This clamping frame 29 comprises a base plate 31, having triangular side plates, or flanges 32 to which a clamping lever 21' is pivoted, as indicated at 22', guide slots 18' being formed in the side flanges 32, extending from points adjacent the pivots 22' to points substantially in the plane of the base plate 31. A clamping roller 19', having end extensions 20' disposed in the guide slots 18' is provided, the roller extending between the side flanges 32, and adapted to be cammed into a slot 17', formed in the base plate. The upper end portion of the base plate 31 is curved, as indicated at 32' in Figs. 4 and 5, and is provided with a cross slot 33. The lower edge of the plate, adjacent the slot 33, is rolled to form a smooth sliding surface 34, for a litter handle supporting strap member 35, anchored at one end to a cross shaft forming the pivot 30 between the bracket plate 27 and the clamping frame. The strap extends along the base plate 31 between the same and the roller 19', passing out through the slot 33 and under the roller 35', then upwardly with its free end above the bracket 27. The strap 35 is folded on itself as indicated at 36, in Fig. 5 to provide three thicknesses which are sewed together, to provide an obstruction, which will not pass between the roller and the base of the bracket 27.

This arrangement disposes the clamping member 29 in an inclined relation to the bracket 27, with the portion 35a of the strap 35 inclining downwardly toward the bracket member, the curved portion 32' of the clamping member extending upwardly above the inclined strap portion 35a.

When the apparatus is put into use the handles of the litters at one side thereof are first positioned on these inclined strap portions 35a, and are retained against lateral movement by the upstanding curved portions 32' of the clamping members. In order to firmly secure the litter handles resting on the strap portions 35a, the free ends 35b of the straps are looped around the litter handles and brought through the clamping members 29 over the strap portions 35 which are next to the base plates 31 and are drawn taut by a downward pull on the free ends 35c of the straps. Manual operation of each of the clamping levers 21' moves the rollers 19' in a similar manner to the roller 19 in Figs. 2 and 3, tensioning the strap members around the litter handles, preventing vertical or lateral movement of the handles with respect to the U-shaped brackets carried by the supporting frame 28. The suspension members 5 firmly support the other sides of the litters with respect to the supporting framework, and their removal is very easily accomplished by simply moving the clamping levers to their release position and removing the litter handles from the loops 10 in Figs. 1 to 3.

A further modification of the clamping and tensioning member is disclosed in Fig. 6. This form of the device comprises a flanged base plate 46 having upstanding side flanges 47. The base plate 46 has a strap crimping slot 48 formed therein between the side flanges 47, and a second slot 49 is formed in the base plate at one end thereof for receiving one end 50 of one of the suspension strap members 51 similar to the suspension member 5 in Fig. 2.

A pivot rod 52 has its ends received in openings in the side flanges 47, this rod being spaced from the face of the base plate to provide sufficient clearance to receive the other end portion 51a of the other strap of the suspension member 5. A flanged strap clamping and tensioning plate 53 is pivoted at 54 on the rod 52, the free extremities of this plate 53 being bent laterally and then rebent, as indicated at 55 to form a strap deflecting tongue operable to pass midway into the slot 48 in the base plate. The relative difference between the thickness of the said laterally bent portion 55 and the longitudinal edges of the slot 48 is substantially equal to, or slightly less than the thickness of the strap members used, so that upon movement of the laterally bent portion 55 into the slot, both strap portions of the suspension member 51a at opposite sides of the laterally bent portion 55 are acutely bent around the edges of the slot, and clamped between the laterally bent portion 55 and the edges of the slot. A coil spring 56 surrounds the shaft 52, one end of the spring being secured under a pin 57 on one of the side flanges 47, and the other end of the spring disposed in engagement with the under surface of the plate 53, exerting an outward pressure on the plate tending to move the same to release position.

A manually operable flanged camming plate 58 is pivoted at 59 to the side flanges 47 of the base plate and comprises the operating means for moving the clamping plate 53 to clamping position. The side flanges of the camming plate 58 are formed with curved camming edges 60, arranged to engage the top of the clamping plate 53 just above the laterally bent end portion 55, the side flanges of this camming plate being tapered from the periphery of the camming edges 60 to a point just opposite the cross rod 52, so that the side flanges will rest on top of the clamping plate 53, with the face of the camming plate in substantially flush relation to the longitudinal edges of the side flanges 47 of the base plate 46.

This form of strap clamping and tensioning member is preferably used on the upper ends of the suspension member 5 to initially adjust the length of the suspension member.

Having thus described my invention, what I claim as new, and desire to secure by Letters Patent, is:

1. In a strap tensioning and securing device, an elongated base plate having opposite parallel side flanges adapted to receive a strap member therebetween, said base plate having a strap receiving slot formed therein extending thereacross between the side flanges, guide slots formed in the side flanges at right angles to the plane of the base plate in a plane passing through the longitudinal center of the slot, an elongated cylindrical strap deflecting roller member having reduced axial extensions at its ends slidably mounted in said guide slots to move between a position spaced from said base plate to a strap deflecting and clamping position substantially midway between the opposite edges of the said strap receiving slot to deflect said strap member into said strap receiving slot and clamp the same between the cylindrical roller member and the edges of the slot, and a camming lever pivoted to the side flanges in a plane passing longitudinally through said strap receiving slot at right angles to the surface of the base plate, said camming lever having a circular camming surface disposed eccentrically of the pivot of said lever and engageable with the surface of the cylindrical strap deflecting roller member to rotate and cam said last-named roller member into said strap receiving slot upon swinging of said lever in one direction.

2. In a strap tensioning and securing device, an elongated base plate having parallel side flanges extending along its side edges at right angles to the base plate to receive a strap member therebetween, said base plate having a strap receiving slot extending thereacross between the said side flanges, said side flanges being formed with guide slots therein extending from points substantially in the plane of the base plate to points spaced laterally from the base plate, an elongated cylindrical clamping roller member rotatably disposed between said side flanges to move between a position in the strap receiving slot and a point between the side flanges and spaced from the base plate, said roller having a diameter equal substantially to the width of the strap receiving slot, less twice the thickness of the aforementioned strap member and having reduced axial guide extensions projecting therefrom into the guide slots, and a camming lever pivoted to said side flanges in a plane passing longitudinally through said guide slots and said strap receiving slot, formed with annular camming means adjacent the side plates, engageable with the cylindrical surface of the roller adjacent the side flanges, to rotatably cam said roller into the plane of said strap receiving slot upon actuation of said lever in one direction to clamp the said strap member between the roller and the edges of the strap receiving slot.

3. In a strap tensioning and securing device, an elongated base plate having opposite parallel side flanges extending along its side edges to receive a strap member therebetween, said base plate having a strap receiving slot extending thereacross between the side flanges, said side flanges having parallel guide slots formed therein, in a plane extending at right angles to the surface of the base plate, passing through the center of said strap receiving slot, said guide slots extending from points at least in the plane of the base plate to points materially spaced from the base plate, an elongated cylindrical roller member disposed between said side flanges having a diameter equal substantially to the width of the slot less twice the thickness of the strap member disposed between the side flanges, said roller member having axial extensions projecting therefrom into the said guide slots, and a camming lever having spaced parallel side flanges disposed between the side flanges of the base plate, in juxtaposed relation thereto, formed with circular camming portions adapted to engage the surface of said roller member adjacent its ends, and pivoted eccentrically of said circular camming surfaces to the side flanges of the base plate in a plane passing through said guide slots and said strap receiving slot, said lever having a handle portion bent angularly intermediate its length to engage the strap inwardly of the extremity of the lever when the lever is in strap clamping position.

GEORGE H. WINDSOR.

REFERENCES CITED

The following references are of record in the file of this patent:

UNITED STATES PATENTS

| Number | Name | Date |
|---|---|---|
| 44,693 | Tattershall | Oct. 11, 1864 |
| 121,974 | Turnbull | Dec. 19, 1871 |
| 330,232 | Hall | Nov. 10, 1885 |
| 697,404 | Grundy | Apr. 8, 1902 |
| 697,710 | Gebhard et al. | Apr. 15, 1902 |
| 815,205 | Nelson | Mar. 13, 1906 |
| 849,573 | Ritz | Apr. 9, 1907 |
| 855,675 | Skinner et al. | June 4, 1907 |
| 1,216,959 | De Camp | Feb. 20, 1917 |
| 1,599,342 | Muhlfeld | Sept. 7, 1926 |
| 2,060,628 | McCormick | Nov. 10, 1936 |
| 2,191,228 | Dowd | Feb. 20, 1940 |
| 2,287,722 | Beazley | June 23, 1942 |
| 2,336,818 | Topinka | Dec. 14, 1943 |
| 2,363,872 | Kiessling | Nov. 28, 1944 |